United States Patent [19]
Kolla et al.

[11] Patent Number: 6,133,348
[45] Date of Patent: Oct. 17, 2000

[54] FLAX SHIVES REINFORCED THERMOPLASTIC RESIN COMPOSITION

[75] Inventors: Francis A. Kolla, Saskatoon; John J. Balatinecz, Toronto, both of Canada

[73] Assignee: Cargill, Incorporated, Minneapolis, Minn.

[21] Appl. No.: 09/364,890

[22] Filed: Aug. 2, 1999

Related U.S. Application Data

[63] Continuation of application No. 09/064,869, Apr. 22, 1998.
[51] Int. Cl.$^7$ .................................................... C08L 97/02
[52] U.S. Cl. ................................................. 524/9; 524/35
[58] Field of Search .......................................... 524/9, 35

[56] References Cited

U.S. PATENT DOCUMENTS

| | | | |
|---|---|---|---|
| 4,201,835 | 5/1980 | Jellinek et al. | 442/83 |
| 5,002,273 | 3/1991 | Palarday et al. | 473/450 |

FOREIGN PATENT DOCUMENTS

| | | |
|---|---|---|
| 2090849 | 7/1982 | United Kingdom . |
| WO 98/03705 | 1/1998 | WIPO . |

OTHER PUBLICATIONS

Akin et al., "Chemical and Structural Analysis of Fiber and Core Tissues from Flax," *J. Sci. Food Agric* 1996. 72, 155–165.

Cooke, "High Performance Fiber Composites with Special Emphasis on the Interface," *J. Polymer Eng.*, vol. 7, No. 3, pp. 199–240 (1987).

Hornsby et al., "Preparation and Properties of Polypropylene Composites Reinforced with Wheat and Flax Straw Fibers," *J. Materials Sciences* 32 (1997) 443–449.

Love et al., "Determination of Phenolic Structures in Flax Fibre by Solid–State $^{13}$CNMR," *Phytochemistry*, vol. 35, No. 2, pp. 489–491 (1994).

McDougall, "Isolation and Partial Characterization of the Non–Cellulosic Polysaccharides of Flax Fiber," *Carbohydrate Research*, 241 (1993) 227–236.

McDougall et al., "Plant Fibers: Botany, Chemistry and Processing for Industrial Use," *J. Sci Food Agric.* 1993, 62, 1–20.

Michell et al., "Cellulosic Fibers for Reinforcement," *Appita*, vol. 31, No. 5 pp. 347–353 (1978).

Mieck et al., "Needle–Punched Hybrid Nonwovens of Flax and PP Fibers–Textile Semiproducts for Manufacturing of Fiber Composites," *Polymer Composites*, Dec. 1996, vol. 17, No. 6, pp. 873–878.

Morvan et al., "Etude Physicochimique et Biochimique de Polysaccharides Extraits de Lin Sons–Rovi," *Plant Physiol. Biochem.*, 1989, 27(3), 451–459.

Park et al., "A Comparison of Compounding Processes for Wood–Fiber/Thermoplastic Composites," *Polymer Composites*, Jun. 1997, vol. 18, No. 3, pp. 425–431.

Riley et al., "Factors Affecting the Impact Properties of Mineral Filled Polypropylene," *Plastics and Rubber Processing and Applications*, 14 (1990) 85–93.

Sharma, "Enzymatic Degradation of Residual Non–Cellulosic Polysaccharides Present on Dew–Rotted Flax Fibers," *Appl. Microbiol. Biotechnol.*, (1987) 26: 358–362.

Trass et al., "Fine Grinding of Wood Chips and Wood Wastes with SZEGO Mill," in Sixth Canadian Bienergy R & D Seminar, B.C., Canada, 198–208, 1987.

Woodhams et al., "Wood Fibers as Reinforcing Fillers for Polyolefins," *Polymer Engineering and Science*, Oct. 1984, vol. 24, No. 15, pp. 1166–1171.

Pott et al., "Upgraded Flax Fibres as Reinforcement in Polymer Composites", apparently arising from a conference and articles in Advanced Materials and Processes and applications vol. 2; Polymers and Ceramics–European Conference; 5th P: 2/107–2/110, Zwijndrecht, Netherlands Society for Materials Science, 1997; Conference Paper; Conference Editors: Sarton, L.A. J.L.; Zeedijk, H.B.; Conference Sponsor: Netherlands Society for Materials Science; Conference Location: Maastricht, The Netherlands; Conference Date: Apr. 1997 (199704) (19704), also known as EUROMAT 97.

El–Hariri et al., "Magnifying utility of flax root debris in particle board manufacture," Proceedings of the First Workshop of the Non–Textile Applications of Flax Working Group, pp. 6–9, Nov. 14–15, 1994, Poznan, Poland.

Gayer, "Natural Fibres in Automotive Components," Proceedings of the First Workshop of the Non–Textile Applications of Flax Working Group, pp. 20–21, Nov. 14–15, 1994, Poznan, Poland.

El–Hariri et al., "Economic Importance of Flax in Egypt," Proceedings of the First Workshop of the Non–Textile Applications of Flax Working Group, pp. 1–10, Nov. 14–15, 1994, Poznan, Poland.

Kozlowski et al., "Plant Residues as Raw Materials for Particleboards," Proceedings of the First Workshop of the Non–Textile Applications of Flax Working Group, pp. 22–41, Nov. 14–15, 1994, Poznan, Poland.

*Primary Examiner*—Peter A. Szekely
*Attorney, Agent, or Firm*—Fitch, Even, Tabin & Flannery

[57] ABSTRACT

The present invention is directed to flax shives reinforced thermoplastic compositions and a method for reinforcing thermoplastic resins. The present invention provides a use for flax shives, which is the portion left over after processing plant materials to separate plant fibers (bast fibers) from the shives.

19 Claims, No Drawings

FLAX SHIVES REINFORCED THERMOPLASTIC RESIN COMPOSITION

This is a continuation of prior application Ser. No. 09/064,869, filed Apr. 22, 1998, which is hereby incorporated herein by reference in its entirety.

The present invention relates to a thermoplastic composite resin composition which includes flax shives, and a method for reinforcing thermoplastic resin compositions. More particularly, shives or mixture of shives and bast fiber is blended with a thermoplastic resin to provide a reinforced resin composite.

BACKGROUND OF THE INVENTION

The plastics industry is one of the largest consumers of organic and inorganic fillers. The total consumption of different types of fillers was about 3.5 million MT in the year 1983 and it is increasing at a rate of 4 to 5% annually. Inorganic fillers such as calcium carbonate, talc, mica and the like are well known, as well as organic fillers such as wood flour, chaff and the like, fibrous materials such as asbestos and glass fiber, as well as graphite, cokes, blown asphalt, activated carbon, magnesium hydroxide, aluminum hydroxide and the like. All of these additives have high specific gravities and their ability to improve physical properties of the composition is limited.

Flax is a commercially important plant fiber crop being grown either for its seed (used in the production of linseed oil) or for its fiber or both. The major industrial uses of flax fiber are in textiles (in the manufacture of linen household textile, linen furnishing fabrics, linen clothing, etc.) and the manufacture of pulp and paper. In the pulp and paper industry, flax fibers are currently used in the production of thin strong papers such as cigarette papers, airmail papers, currency papers, high quality permanent record bond papers and high quality writing papers.

Another possible use for flax fiber is in the filling and reinforcement of thermoplastic matrix resins, such as polyethylene and polypropylene. Composites of these plastics with lignocellulosic fillers (e.g. wood flour) are already in commercial use, for example, in such applications as interior molded auto parts (e.g. dash and door panels, trunk liners), exterior plastic-composite lumber and furniture components.

The potential of using flax fibers in plastic applications as a substitute for synthetic fibers such as glass, carbon, nylon, polyester, etc. has been recognized. For example, GB 2090849 describes the incorporation of flax bast fibers into a thermoplastic resin blend. The use of flax bast fibers for reinforcing resins results in processing problems, as the flax bast fibers tend to "ball up" during processing. Resin blends containing flax shives or combinations of shives and less than about 30 weight percent bast fibers are not described. Further, purposeful attempts have been made to exclude flax shive from flax fiber preparations used for reinforcing composites. For example, Mieck et al. (*Polymer Composites*, December 1996, Vol. 17, No. 6), suggest that for better composite characteristics, the fibers should be free from shives.

An object of the present invention is to provide a resin composition that is reinforced with flax shives.

It is another object of the invention to provide a method for reinforcing resin compositions.

Other objects, advantages, features and characteristics of the present invention will become more apparent upon consideration of the following description and the appended claims.

SUMMARY OF THE INVENTION

The present invention is directed to flax shives reinforced thermoplastic compositions and a method for reinforcing thermoplastic resins. The present invention provides a use for flax shives, which is the portion left over after processing plant materials to separate plant fibers (bast fibers) from the shives.

In accordance with the invention, a thermoplastic resin is blended with from about 10 to about 80 weight percent flax shives, based on the weight of the composition. In an important aspect of the invention, the thermoplastic resin has a melting point of at least about 140° C., and a density of not more than about 1.5 g/cm$^3$ and a weight average molecular weight in the range of from about 100,000 to about 800,000. In a very important aspect of the invention, the thermoplastic resin is selected from the group consisting of polypropylene, polyethylene, polyvinyl chloride, styrene, acrylonitrile, acrylonitrile-styrene, acrylonitrile-butadiene-styrene, and mixtures thereof.

In another aspect of the invention, the flax shives that are blended with the resin are supplied as shives which include not more than about 30 weight % bast fibers, and in an important aspect, not more than about 10% weight bast fibers and in a very important aspect, not more than about 5 weight percent bast fibers. We have found with higher bast content, the bast fibers will ball and will be deleterious to making the composites. In the aspect of the invention where the shives include bast fibers, the bast fibers have a mean fiber length of less than about 2 mm. The flax shives should not have a mean particle size of more than about 10 mesh (which means the particles should be able to pass through a 10 mesh screen or smaller screen), in a very important aspect of the invention, the flax shives have a mean particle size of about 10 to about 100 mesh. In an aspect of the invention where a more woody surface texture is desired, flax shives are used where about 70% of the flax shives will pass through 10–20 mesh.

In another aspect of the invention, flax shives blended with thermoplastic resins provide compositions having a melt flow index of about 0.1 to about 25.0 degrees C/10 min. The resulting composite thermoplastic resin had a tensile strength of at least about 3,000 psi, a tensile modulus of at least about 150×10$^3$ psi, a flexural strength of at least about 5,000 psi, and a flexural modulus of at least about 200×10$^3$ psi. Articles molded with flax shives reinforced thermoplastic resins had significantly lower densities, such as at least about 8% lower than articles molded with resins having inorganic fillers.

In another aspect, the present invention provides a method for reinforcing thermoplastic resin compositions. In accordance with the method of the invention, from about 10 to about 80 weight percent flax shives, based on the weight of the composition, is blended with resin. The flax shives include not more than about 30 weight percent bast fibers, and in an important aspect, not more than about 10 weight percent bast fiber and in a very important aspect not more than about 5 weight percent base fiber. In the aspect of the invention where the shives include bast fibers, the bast fibers have a mean fiber length of less than about 2 mm. In an important aspect of the invention, the flax shives should not have a mean particle size of greater than about 10 mesh, and in an important aspect a mean particle size in the range of from about 10 to about 100 mesh.

The thermoplastic resin and flax shives are blended together and are exposed to heat during or after blending which heat is effective for melting the resin but is not deleterious to the shives. The blending should be effective to completely mix or disperse the flax shives throughout the resin matrix. The method of the invention is effective for providing a reinforced thermoplastic resin composition with a tensile strength of at least about 3,000 psi, a tensile modulus of at least about $150 \times 10^3$ psi, a flexural strength of at least about 5,000 psi, and a flexural modulus of at least about $200 \times 10^3$ psi.

DETAILED DESCRIPTION OF THE INVENTION

Definitions

"Flax" as referred to in the present application refers to plant fiber crops being grown either for seed (i.e. linseed oil) or for its fiber or for both. Examples of such crops include *Linum usitatissimum* (common flax), *L. usitatissimum* album (white-flowered flax), and *L. usitatissimum* vulare (blue-flowered flax).

The high quality fibers of flax are from the stem of the plant and are in the phloem or bast, hence the reference to flax as a "bast fiber" crop. As used herein, "bast" refers to those fibers from the phloem region. Further, as used herein, flax "shives" refers to the core tissue particles that remain after bast fibers are separated from the flax stem. Flax shives include blends and mixtures of all cell types including vascular bundles and parenchyma cells.

As used herein, the term thermoplastic resin refers to resins including polypropylene (PP), polyethylene (PE), polyvinyl chloride (PVC), styrene resins, acrylonitrile resins, acrylonitrile-styrene resins (SAN), acrylonitrile-butadiene-styrene resin (ABS) and the like, their compounded mixtures, their copolymers, their reactive modified resins and the like.

Flax Shives Used In The Invention

In an important aspect of the invention, flax shives is supplied as at least about 70 weight % shives, and in an important aspect, at least about 90 weight % shives, and in a very important aspect about 95 weight % shives. An example of a process for the production of flax shive is described in U.S. Ser. No. 09/032,903, filed Mar. 2, 1998, which is hereby incorporated by reference and in PCT/CA97/00511, published on Jan. 29, 1998, as WO 98/03705, which is also hereby incorporated by reference.

The morphological nature and chemical composition of the flax shive may influence many mechanisms that contribute to the properties and performance of reinforced composites. These include, the dispersion and orientation of shive and bast fibers in the matrix polymer, the compatibility of shive and bast fibers to matrix polymer, the reactivity of shive and bast fibers with additives, the resistance to microorganisms and the resistance to water uptake.

All chemical analyses and procedures were done according to the Technical Associate of the Pulp and Paper Industry (TAPPI) test methods as shown in Table 1. Flax shives used in the invention may be characterized chemically as set forth in Table 2. Generally, however, the shives used in the invention do not have more than about 24 weight percent lignin and preferably less than about 20 weight percent lignin and have more than about 70 weight percent polysaccharides. Indeed, the shives used in the invention are distinct from lignocellulosic wood fillers, such as wood flour, not only because of a lower lignin content in shives, but also as compared to wood flour, flax shive particles are more longitudinal in shape whereas wood flour particles are isodiametric in shape (i.e., length and width as nearly identical). Further, hardwoods and softwoods tend to be more heterogenous in cell type then flax shive and, hence, wood flour from hardwoods and softwood has a less consistent and predictable composition as compared to flax shives.

The flax shives should not have a mean particle size of more than about 10 mesh, and in an important aspect, the shives have mean particle sizes of from about 10 to 100 mesh. In another aspect, not more than about 25 weight percent of the shive particles are smaller than 100 mesh. A finer shive material could be used, but would not have the reinforcing effect of a material having a larger particle size.

TABLE 1

| Chemical analysis and TAPPI test methods | |
|---|---|
| Chemical Analysis | TAPPI test methods |
| Moisture content | T 258 om-85 |
| pH of water extract | T 252 om-90 |
| Extractives | |
| Hot water | T 204 os-76 |
| Alcohol-benzene | T 204 os-76 |
| Acetone | T 204 os-76 |
| Di-chloromethane | T 204 os-76 |
| 1% sodium hydroxide | T 212 om-88 |
| Holocellulose | T 212 om-75 |
| α-cellulose | T 203 om-88 |
| Klason lignin | T 222 om-83 |
| Inorganic compounds | |
| Ash | T 211 om-85 |
| Silicates | T245 om-88 |

TABLE 2

| Chemical analysis of flax shives | |
|---|---|
| Composition | shive |
| Basic density, g/cm$^3$ | 1 to 1.2 |
| Moisture content, % | 7.5 |
| pH of water extract | 6.5 |
| Extractives | |
| Hot water, % | 4.4 |
| Alcohol-benzene, % | 2.1[0.1] |
| Acetone | 0.9 |
| Di-cholormethane | 2.1[0.1] |
| 1% NaOH, % | 28[1] |
| Holocellulose | |
| α-cellulose, % | 38.6 |
| β-cellulose % | 14.1[0.5] |
| γ-cellulose | 23.6[0.8] |
| Klason lignin, % | 19.0 |
| Inorganic materials | |
| Ash, % | 2.0[0.1] |
| Silicates, ppm | 737.5 |

Note:
values for extractives are not additive.
[ ] - standard deviations

Preparation of Fiber Reinforced Composites

In an important aspect of the invention, from about 10 to about 80 weight percent flax shive is blended with the thermoplastic resin.

The polymer matrix is blended or compounded with the shives in a manner effective for completely blending the flax shives with the thermoplastic resin. The melting point of the resin should be from about 140° C. to about 220° C. One example of a mixer effective for blending the fibers and thermoplastic resin is a high intensity thermokinetic mixer, such as a Werner and Pfleidere Gelimat Model 456441G1. In these types of mixers, frictional energy heats the contents until they become molten, a process that takes seconds or minutes depending on the speed of the impeller. In another aspect of the invention, heat from an external source can be supplied to melt the thermoplastic resin and effect blending of the flax shives. In this aspect of the thermoplastic resin is heated to a temperature of not more than about 220° C. Once compounded, the melted blend is allowed to cool to room temperature and then processed by conventional plastic processing technologies. Typically, the cooled blend is granulated into fine particles. The fine particles are then utilized for extrusion, injection or compression molding to form finished parts or products.

Processing Aids

In another aspect, the composition may also include processing aids. These processing aids or modifiers act to improve the dispersion of fibers in the polymer matrix and also help prevent the absorption of water into the fibers and improve the strength of the composite. Addition level of modifier or compatibilizer depends on target properties. Where higher tensile and flexural strengths are desired, higher levels of modifier or compatibilizer will be required. A compatibilizer is not required to achieve higher stiffness. Examples of processing aids include maleated polypropylene, Epolene E-43 (Eastman Kodak), maleated polyethylene, and Fusabond MB-110D (Dupont).

While not intending to be bound by any theory, the improved performance of treated composites may be attributed to improved interaction and adhesion between the fibers and the matrix polymer, which provides more efficient stress transfer from the matrix to the fibers, and also to better dispersion of fibers in the matrix. This may be accomplished by encapsulation mechanism of the fiber by the compatibilizer. The surface of the fiber, once encapsulated, becomes hydrophobic, and is therefore easily wetted by the hydrophobic polymer.

Comparison of Flax Shive, Wood Flour and Calcium Carbonate.

Calcium carbonate, talc, mica and glass fiber are common inorganic fillers for polyolefins (polypropylene and polyethylene). Other inorganic fillers include silica, kaolin and wollastonite. Calcium carbonate is available in a variety of particle size. Smaller particle sizes are generally selected to provide superior impact strength. In many polyolefins applications, carbonate competes with talc, but carbonate has an advantage when color or impact is important. Talc is usually selected as the filler for polyolefins to achieve higher stiffness than is possible with calcium carbonate. Mica as filler offers some unique characteristics in terms of stiffness, although at the cost of reduced impact strength. Glass fiber is the most widely used reinforcement agent for polyolefins. Glass fiber offers outstanding tensile strength, stiffness, impact strength, and heat deflection temperature. Lignocellulosic-based fillers are gaining some interest as reinforcement agents for polyolefins. This is because they provide low cost opportunities for achieving high stiffness. A drawback of cellulose-based fillers is their greater sensitivity to moisture.

Table 3 shows the properties of filled polypropylene based on flax shive, wood flour, calcium carbonate, talc, mica and glass fiber formulations.

TABLE 3

Properties comparison of flax shive reinforced polypropylene (PP) composites of the invention with commercial composites (Commercial composite data taken from Additives and Modifiers handbook 1992 and Modern Plastic Encyclopedia 1993)

| Property of Composite | PP | 30% Shive * | 40% Shive | 30% Wood flour | 30% Calcium carbonate | 40% Talc | 40% Mica | 40% Glass fiber |
|---|---|---|---|---|---|---|---|---|
| Specific gravity, g/cm3 | 0.91 | 1.00 | 1.00 | 1.00 | 1.25 | 1.27 | 1.26 | 1.23 |
| Tensile strength (MPa) | 31 | 33 | 32 | 34 | 31 | 35 | 39 | 110 |
| Tensile modulus (GPa) | 1.1 | 2.3 | 2.6 | 2.2 | 1.7 | 4 | 7.6 | 9 |
| Flexural strength (MPa) | 50 | 62 | 66 | 64 | 56 | 63 | 62 | 131 |
| Flexural modulus (GPa) | 1.4 | 2.7 | 3.5 | 2.7 | 1.9 | 4.3 | 6.9 | 6.2 |
| Izod-notched (J/m) | 27 | 21 | 25 | 23 | 21 | 32 | 27 | 107 |
| Izod-unnotched (J/m) | 469 | 94 | 91 | 114 | 241 | — | — | — |
| Heat Deflection temp. (1.82 MPa) ° C. | 54 | 89 | — | — | — | 93 | 96 | 150 |
| Water abs. 24 hours (%) | 0.07 | 0.57 | 0.99 | 0.40 | 0.06 | 0.02 | 0.03 | 0.06 |

* Shive having not more than about 10 weight percent bast fibers.

As can be seen in Table 3, at 30% weight loading level, the tensile and flexural strengths of flax shive reinforced polypropylene composites compare favorably with the strength properties of wood flour, calcium carbonate, talc and mica based formulations. Glass fiber at 40% weight loading, provide outstanding strengths, at least twice better than those obtained with shive, wood flour, calcium carbonate, talc and mica. Shives at 30% loading have higher stiffness than calcium carbonate at the same weight loading level, but 1.5 times lower than the stiffness of 40% weight loading level talc, and at least 2.5 times lower than that of 40% mica and glass fiber. Flax shive at 30% weight loading provide the same impact strength at 30% wood flour and 30% calcium carbonate, but slightly lower than those of 40% talc and 40% mica. The impact strength of 40% glass fiber is 3 to 5 times higher than those of any of the other fillers. Glass fiber at 40% level has the highest heat deflection temperature. The heat deflection temperature of flax shive is comparable to that of wood flour, calcium carbonate, but slightly lower than those of 40% talc and 40% mica. Unlike all inorganic fillers, flax shive based composites are more sensitive to water. Flax shive composites absorbed more than 0.50% of water compared to 0.40% for wood flour, 0.06% for calcium carbonate and glass fiber, and 0.02 to 0.03% for talc and mica. An important advantage of flax shive reinforced composites as opposed to inorganic filler based composites is their low density. Flax shive composites have a density of 1 g per cubic centimeter compared with 1.23–1.27 g per cubic centimeter for inorganic filler.

The low density of flax shive is a major advantage in thermoplastic composites since at equal volume loading, composites will weigh less, which could result in significant cost saving in terms of use of the composites as a part of a larger article, of shipment of composites and of raw material required to make molded composites at equal volume.

Composites which are made according to the invention are particularly advantageous as compared to inorganic fillers, such as limestone (calcium carbonate) having the same particle size as the shives. Flax shive reinforced composites have a flexural strength and flexural modulus of at least about 8% better than composites reinforced with calcium carbonate, and in a very important aspect of the invention, had a flexural strength and flexural modulus at least about 10% better than composites reinforced with calcium carbonate.

EXAMPLES

Example I

Flax Fiber Reinforced Thermoplastic Composites

The thermoplastic polymers used were polypropylene, PP (Profax 6301, Himont Canada Inc., density 0.96 g/cm$^3$, melt flow index 10 dg/min) and high density polyethylene, (Sclair 2909, Dupont Canada Inc., density 0.96 g/cm$^3$, melt flow index 14 dg/min) . These polymers were selected because they can be readily processed below the atmospheric decomposition temperature of lignocellulosic materials (about 220° C.); they are widely used; and they are dispensable at low cost.

Maleated polypropylene, Epolene E-43 (manufactured by Eastman Chemical Products Inc.) and maleated polyethylene, Fusabond MD-110D (manufactured by Dupont Canada Inc.) were used as processing aids or surface modifying agents of flax shives. These modifiers were used for several reasons. They act as processing aids, helping the dispersion of shives and fibers in the polymer matrix. They also help to prevent the absorption of water into the shives and improve the strength of the composite.

Flax shives were provided in accordance with the process described in U.S. Ser. No. 09/032,903. Prior to incorporating flax shives with thermoplastic polymers, flax shives were mechanically treated with modifiers in the high intensity thermokinetic mixer (Werner and Pfleidere Gelimat Model 456441G1). The moisture content of flax shives was in the range of 7–10%. About 200 g of flax shives were treated with 0, 1, 3 and 5 percent of modifying agent (relative to weight of flax fibers) for 90 seconds.

After 90 seconds of flax shives treatment, the polymer matrix was subsequently compounded with shives in the high intensity thermokinetic mixer running at top speed of 3,300 rpm, and automatically discharged at a pre-set temperature of 190° C. The amount of shive in the compound was 0, 30, 40 and 50 percent by weight. The main advantage of the Gelimat mixer is its ability to obtain optimum dispersion of shives in a short time. High speed shearing action by the rotation of the rotor blade quickly brings the plastic to its melting point. The system does not require any external heating source other than heat generated by kinetic energy. Once compounded, the melted compound was allowed to cool to room temperature and then granulated into fine particles in a Brabender granulator (Model S-10-9). The granulated compound was finally injection molded using Engel Es-28 machine equipped all with a standard ASTM test mold. The injection molding conditions were: injection pressure (MPa) –4.83; clamp pressure (MPa) –11.72; injection temperature (°C.) –204; injection time (sec.) –9.5; cooling time (sec.) –25; and mold opening time (sec.).

Mechanical Property Tests

The mechanical properties, tensile properties, flexural properties, and impact properties were tested at room temperature according to ASTM D 638, ASTM D790, and ASTM D256, respectively. These properties were measured with a standard computerized Instron Tester (Sintech, Model 20). The cross-head speed during the tensile and flexural testing was 12.5 mm/min. Melt flow index, and heat deflection temperature was determined following the ASTM D1238, and ASTM D648, respectively. Properties of flax shive composites are shown in Table 4.

TABLE 4

Mechanical Properties of Flax Shive Reinforced Thermoplastic Composites (shive loading: 30%; unmodified fiber; PP: polypropylene; and PE: high density polyethylene)

| Property | Pure Polymers | | Shive | |
|---|---|---|---|---|
| | PP | PE | PP | PE |
| Tensile strength (MPa) | 31.20 | 20.80 | 32.72 | 24.58 |
| Tensile modulus (GPa) | 1.1 | 0.7 | 2.3 | 1.8 |
| Flexural strength (MPa) | 49.90 | 33.60 | 62.06 | 52.57 |
| Flexural modulus (GPa) | 1.4 | 1.0 | 2.7 | 2.4 |
| Izod-notched (J/m) | 27 | 71 | 21 | 44 |
| Izod-unnotched (J/m) | 469 | 784 | 94 | 118 |

Effect of Processing Aid Concentration

Polypropylene and high density polyethylene were used for all blends. The amount of flax shive in the blends was constant at 30% by weight. The addition levels of modifying agent were 0, 1, 3 and 5% by weight of fibers. Maleated polypropylene is a polypropylene homopolymer grafted with maleic anhydride and was used as compatibilizer or modifier with polypropylene. Maleated polyethylene (Fusabond MB 110D), a polyethylene grafted with maleic anhydride was used as compatibilizer with high density polyethylene. Tabulated data related to the effect of compatibilizers on the properties of the composites are shown in Table 5.

TABLE 5

Effect of modifying agents concentration on the mechanical properties of flax shive reinforced thermoplastics composites (shive loading: 30%)

| Property | Polypropylene Epolene E-43 concentration (%) | | | | High density polyethylene Fusebond MB 110D concentration (%) | | | |
|---|---|---|---|---|---|---|---|---|
| | 0 | 1 | 3 | 5 | 0 | 1 | 3 | 5 |
| Tensile strength (MPa) | 25.57 [0.2] | 27.70 [0.7] | 29.57 [1.3] | 32.72 [0.3] | 17.48 [0.4] | 19.74 [0.4] | 22.88 [0.7] | 24.58 [0.8] |
| Tensile modulus (GPa) | 1.9 [0.1] | 1.9 [0.1] | 2.1 [0.1] | 2.3 [0.1] | 1.8 [0.1] | 1.9 [0.1] | 1.9 [0.1] | 1.5 [0.1] |
| Flexural strength (MPa) | 50.84 [0.5] | 56.13 [0.6] | 60.13 [0.6] | 62.06 [0.9] | 42.63 [0.8] | 46.49 [0.5] | 53.40 [0.4] | 52.57 [0.6] |

TABLE 5-continued

Effect of modifying agents concentration on the mechanical properties of flax shive reinforced thermoplastics composites (shive loading: 30%)

| | Polypropylene Epolene E-43 concentration (%) | | | | High density polyethylene Fusebond MB 110D concentration (%) | | | |
|---|---|---|---|---|---|---|---|---|
| Property | 0 | 1 | 3 | 5 | 0 | 1 | 3 | 5 |
| Flexural modulus (GPa) | 2.5 [0.1] | 2.6 [0.1] | 2.6 [0.1] | 2.7 [0.04] | 2.4 [0.1] | 2.5 [0.1] | 2.8 [0.1] | 2.4 [0.1] |
| Izod-notched (J/m) | 25 [1.3] | 24 [1] | 24 [1] | 21 [0.9] | 43 [6] | 36 [1] | 40 [3] | 44 [3] |
| Izod-unnotched (J/m) | 96 [16] | 84 [9] | 84 [9] | 94 [10] | 78 [13] | 76 [14] | 102 [7] | 118 [19] |

As can be observed, the addition of the compatibilizer provides a considerable increase in the strengths of the composites. The tensile and flexural strengths increased with increasing concentration of modifying agent up to 5%. At 5 percent, the tensile strength was increased by 20 to 40% compared with an unmodified composites. The flexural strength was increased by 20 to 30% with the use of a compatibilizer at 5%. The observed improvement in the tensile and flexural strength of the composites following shive treatment is in agreement with previous works done with lignocellulostc fibers (Woodhams et al., *Wood Fibers as Reinforcing Fillers for Polyolefins*, Polym. Eng. Sci. 24 (15): 1166–1171, 1984).

Effect of Fiber Loading

The influence of fiber loading on the mechanical properties of flax shive thermoplastic composites was examined. The amounts of shive used in the blends were 0, 30, 40 and 50% by weight. The concentration of modifying agent was maintained constant at 5%. Both polypropylene and high density polyethylene were used as matrix polymers.

There were no major processing problems with flax shive. Tabulated data related with the influence of flax shive loading on the mechanical properties of the composites are shown in Tables 6.

TABLE 6

Effect of flax shive loading on the mechanical properties of flax shive reinforced thermoplastics composites (Epolene E-43 concentration: 5%; and Fusabond MB-110D concentration: 5%)

| | Polypropylene shive loading (%) | | | | High density polyethylene shive loading (%) | | | |
|---|---|---|---|---|---|---|---|---|
| Property | 0 | 30 | 40 | 50 | 0 | 30 | 40 | 50 |
| Tensile strength (MPa) | 31.20 [0.3] | 32.72 [0.3] | 32.20 [0.9] | 31.22 [3.3] | 20.80 [0.3] | 24.58 [0.8] | 26.05 [0.8] | 22.95 [1.5] |
| Tensile modulus (GPa) | 1.1 [0.1] | 2.3 [0.1] | 2.6 [0.1] | 2.8 [0.3] | 0.7 [0.1] | 1.8 [0.1] | 2.3 [0.1] | 2.6 [0.2] |
| Flexural strength (MPa) | 49.90 [0.6] | 62.06 [0.9] | 65.71 [0.9] | 68.42 [1.5] | 33.60 [0.8] | 52.57 [0.6] | 59.22 [1.5] | 63.22 [0.9] |
| Flexural modulus (GPa) | 1.4 [0.1] | 2.7 [0.04] | 3.5 [0.1] | 4.2 [0.1] | 1.0 [0.1] | 2.4 [0.1] | 3.6 [0.1] | 4.6 [0.2] |
| Izod-notched (J/m) | 27 [9] | 21 [1] | 25 [2] | 28 [1] | 71 [6] | 44 [3] | 44 [3] | 41 [2] |
| Izod-unnotched (J/m) | 469 [193] | 94 [10] | 91 [5] | 67 [12] | 784 [105] | 118 [19] | 95 [7] | 89 [5] |

Effect of Matrix Polymer Types

The mechanical properties of flax shive reinforced composites for both polypropylene and high density polyethylene are shown in Table 7 for comparison.

TABLE 7

Effect of matrix polymer types on the mechanical properties of flax shive reinforced thermoplastic composites (shive loading: 30%; Epolene E-43 level: 5%; and Fusabond MB-110D level: 5%)

| | Polypropylene (PP) | | High density Polyethylene (PE) | |
|---|---|---|---|---|
| Property | unfilled PP | 30% filled PP | unfilled PE | 30% filled PE |
| Tensile strength (MPa) | 31.20 [0.3] | 32.72 [0.3] | 20.80 [0.3] | 24.58 [0.8] |
| Tensile modulus (GPa) | 1.1 [0.1] | 2.3 [0.1] | 0.7 [0.1] | 1.8 [0.1] |
| Flexural strength (MPa) | 49.90 [1.1] | 62.06 [0.9] | 33.60 [0.8] | 52.57 [0.6] |
| Flexural modulus (GPa) | 1.4 [0.1] | 2.7 [0.04] | 1.0 [0.1] | 2.4 [0.1] |
| Izod-notched (J/m) | 27 [9] | 21 [1] | 71 [6] | 44 [3] |
| Izod-unnotched (J/m) | 469 [193] | 94 [10] | 784 [105] | 118 [19] |

The properties of unfilled or pure polymers are also shown for reference. Except for impact properties, the shive reinforced polypropylene composites performed better than the shive reinforced polyethylene composites with the respect to strength and modulus properties. This is not surprising considering the relative mechanical properties of the pure polymers.

Thermal Properties

The results for melt flow index values are shown in Table 8.

TABLE 8

Effect of flax shive loading on the thermal properties of flax shive reinforced thermoplastics composites (Epolene E-43 level: 5%; Fusabond MB-110D level: 5%; PP: polypropylene; and PE: high density polyethylene)

| Property | shive loading (%) | flax shive PP | flax shive PE |
|---|---|---|---|
| Melt flow index | 0 | 14 | 11 |
| (dg/10 min) | 30 | 6.0 | 4 |
|  | 50 | 3.3 | 1.5 |
| Heat deflection | 0 | 54 | 44 |
| temp. (1.82 | 30 | 89 | 72 |
| MPa) (° C.) | 50 | 111 | 103 |

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A reinforced thermoplastic resin composition comprising:
   a thermoplastic resin; and
   from about 10 to about 80 weight percent flax shives, based on the weight of the composition, the flax shives having not more than about 30 weight % bast fibers, the bast fibers having a mean fiber length of less than about 2 mm, and the flax shives having a mean particle size of not more than about 10 mesh.

2. The composition of claim 1 wherein the reinforced thermoplastic resin composition has a tensile strength of at least about 3,000 psi, a tensile modulus of at least about $150 \times 10^3$ psi, a flexural strength of at least about 5,000 psi, and a flexural modulus of at least about $200 \times 10^3$ psi.

3. The composition of claim 1 wherein the thermoplastic resin has a melting point of at least about 140° C., a density of not more than about 1.5g/cm$^3$, and a weight average molecular weight in the range of from about 100,000 to about 800,000.

4. The composition of claim 3 wherein the thermoplastic resin is selected from the group consisting of polypropylene, polyethylene, polyvinyl chloride, styrene, acrylonitrile, acrylonitrile-styrene, acrylonitrile-butadiene-styrene, and mixtures thereof.

5. The composition of claim 1 wherein the composition further comprises a processing aid selected from the group consisting of maleated polypropylene, maleated polyethylene, functionalized polyolefins, and mixtures thereof.

6. A method for reinforcing a thermoplastic resin composition comprising:
   blending from about 10 to about 80 weight percent flax shives, based on the weight of the composition, with a thermoplastic resin, the flax shives having not more than about 30 weight % bast fibers, the bast fibers having a mean fiber length of less than about 2 mm, the flax shives having a mean particle size of not more than about 10 mesh.

7. The method of claim 6 wherein the method is effective for providing a reinforced thermoplastic resin composition with a tensile strength of at least about 3,000 psi, a tensile modulus of at least about $150 \times 10^3$ psi, a flexural strength of at least about 5,000 psi, and a flexural modulus of at least about $200 \times 10^3$ psi.

8. The method of claim 6 wherein the blending of shives with thermoplastic resin is effective for melting the thermoplastic resin and completely dispersing the flax fiber in the resin.

9. The method of claim 6 wherein the thermoplastic resin has a melting point of at least about 140° C., a density of not more than about 1.5 g/cm$^3$, and a weight average molecular weight in the range of from about 100,000 to about 800,000.

10. The method of claim 6 wherein the thermoplastic resin is selected from the group consisting of polypropylene, polyethylene, polyvinyl chloride, styrene, acrylonitrile, acrylonitrile-styrene, acrylonitrile-butadiene-styrene, and mixtures thereof.

11. The method of claim 6 wherein a processing aid selected from the group consisting of maleated polypropylene, maleated polyethylenes, functionalized polyolefin and mixtures thereof, is added during blending.

12. A reinforced thermoplastic resin composition comprising:
   a thermoplastic resin; and
   from about 10 to about 80 weight percent flax shives, based on the weight of the composition, the flax shives having not more than about 10 weight % bast fibers, the bast fibers having a mean fiber length of less than about 2 mm, and the flax shives having a mean particle size of not more than about 10 mesh.

13. The composition of claim 12 wherein the reinforced thermoplastic resin has a tensile strength of at least about 3,000 psi, a tensile modulus of at least about $150 \times 10^3$ psi, a flexural strength of at least about 5,000 psi, and a flexural modulus of at least about $200 \times 10^3$ psi.

14. The composition of claim 12 wherein the thermoplastic resin has a melting point of at least about 140° C., a density of not more than about 1.5g/cm$^3$, and a weight average molecular weight in the range of from about 100,000 to about 800,000.

15. The composition of claim 14 wherein the thermoplastic resin is selected from the group consisting of polypropylene, polyethylene, polyvinyl chloride, styrene, acrylonitrile, acrylonitrile-styrene, acrylonitrile-butadiene-styrene, and mixtures thereof.

16. The composition of claim 12 wherein the composition further comprises a processing aid selected from the group consisting of maleated polypropylene, maleated polyethylene, a functionalized polyolefin, and mixtures thereof.

17. The composition of claim 12 wherein the flax shives include not more than about 5 weight percent bast fibers.

18. The composition of claim 12 wherein the flax shives have a mean particle size of from about 10 to about 100 mesh.

19. The composition of claim 17 wherein the flax shives have a mean particle size of from about 10 to about 100 mesh.

* * * * *